US007211732B2

(12) United States Patent
Yagi et al.

(10) Patent No.: US 7,211,732 B2
(45) Date of Patent: May 1, 2007

(54) CABLE CONNECTING STRUCTURE

(75) Inventors: Yukihiro Yagi, Tokyo (JP); Shozo Kobayashi, Tokyo (JP); Hiroshi Niinobe, Tokyo (JP); Yasuichi Mitsuyama, Tokyo (JP); Noriaki Horiguchi, Tokyo (JP); Masahiro Suetsugu, Tokyo (JP)

(73) Assignees: The Furukawa Electric Co., Ltd., Tokyo (JP); Fujikura Ltd., Tokyo (JP); Viscas Corporation, Tokyo (JP)

( * ) Notice: Subject to any disclaimer, the term of this patent is extended or adjusted under 35 U.S.C. 154(b) by 0 days.

(21) Appl. No.: 11/066,441

(22) Filed: Feb. 28, 2005

(65) Prior Publication Data

US 2005/0221650 A1 Oct. 6, 2005

(30) Foreign Application Priority Data

Mar. 1, 2004 (JP) ............................ 2004-055658
Apr. 27, 2004 (JP) ............................ 2004-131208

(51) Int. Cl.
*H02G 15/02* (2006.01)
*H01R 4/00* (2006.01)

(52) U.S. Cl. ................ 174/74 R; 174/77 R; 174/84 R; 174/92

(58) Field of Classification Search .............. 174/74 R, 174/74 A, 75 R, 76, 77 R, 78, 84 R, 88 R, 174/92, 93, 94 S
See application file for complete search history.

(56) References Cited

U.S. PATENT DOCUMENTS 3,363,049 A * 1/1968 Gosling et al. ............... 174/85
RE28,837 E * 6/1976 Silva ........................... 174/78
4,032,205 A * 6/1977 Taj ............................. 439/208
4,549,039 A * 10/1985 Charlebois et al. ....... 174/72 R

FOREIGN PATENT DOCUMENTS

JP 5-67140 3/1993
JP 6-46193 11/1994
JP 2003-87920 3/2003

* cited by examiner

*Primary Examiner*—William H. Mayo, III
(74) *Attorney, Agent, or Firm*—Oblon, Spivak, McClelland, Maier & Neustadt, P.C.

(57) ABSTRACT

A cable connecting structure, which includes a cable accommodating box comprising: a box main body in which a connected portion of two cables is accommodated; a first flange portion which is attached to one end of said box main body, and includes a first cable port through which one of said two cables is received; and a second flange portion which is attached to other end of said box main body, and includes a second cable port through which other of said two cables is received, and a tube portion for retrieving a grounding cable, a main portion of which protrudes inward said box main body.

20 Claims, 11 Drawing Sheets

CABLE CONNECTING STRUCTURE

FIELD OF THE INVENTION

The present invention relates to a cable connecting structure.

RELATED ART

When the power cable is laid by being buried under the ground, the connected portion of the cable needs to be protected from the damage of breakage or water-infiltration. As the means to protect the connected portion of the cable, there is known a container called as a coffin box. The coffin box is a container made of FRP (Fiber Reinforced Plastic) or the like. For example, there is disclosed in Japanese Patent Provisional Publication No. 2003-87920 a coffin box in which two facing boat form shaped coffin box pieces formed by cutting a cylindrical body along the longitudinal direction are faced each other so as to cover the connected portion of the cable.

Furthermore, as disclosed in Japanese Patent Provisional Publication No. Hei 5-67140, the coffin box includes a retrieve port for a grounding cable to pull the grounding cable out of the connected portion of the cable in the coffin box.

In place of the coffin box using two boat form shaped coffin box pieces, there is known a coffin box comprising a cylindrical main body and the flange portions attached to both ends of the main body in which the cable and the grounding cable are pulled out through the flange portion(s). This type of coffin box is easy to be manufactured with a lower cost.

The above-mentioned cylinder type coffin box includes a box main body 122, flange portions 120A, 120B connected to the respective ends of the box main body 122, as shown in FIG. 9A. The box main body comprises a cylinder. One of the flange portion 120A includes a cable port 103A and retrieving tube 121 for the grounding cable, and the other flange 120B includes a cable port 103B.

A method for manufacturing the cable connecting structure using the cylinder type coffin box is described with reference to FIGS. 9 to 10. One of the cable 102A to be connected is inserted through the cable port 103A in the flange portion 120A, as shown in FIG. 9A. In the flange portion 120A, there is further provided the retrieving tube 121 for the grounding cable on the same side of the cable port 103A. Furthermore, the box main body 122 is fixed to the other flange portion 120B, and the other cable 102B is inserted through the cable port 103B in the flange portion 120B. The cable port 103A, 103B has an appropriate length from the face of the flange portion 120A, 120B so that the anticorrosive tape can be wound around the cable port. After the insulating layer and the shielding layer of the cable 102A, 102B are sequentially strip-treated in step manner, the conductors are connected using a conductor-connecting ferrule or the like, and then a reinforced insulating layer such as a rubber block is attached around the conductor-connecting ferrule to form the cable connecting main body 101 (refer to FIG. 9B). In the drawing, the inner structure of the cable connecting main body 101 is omitted. The cable 106 is inserted through the retrieving tube 121 for the grounding cable.

The grounding cable 106 is cut at an appropriate portion so that an outer conductor layer 106*a* and an inner conductor layer 106*b* are exposed from an end portion of a sheath layer of the grounding cable 106 (refer to FIG. 9C). The outer conductor layer 106*a* and the inner conductor layer 106*b* are connected respectively to the corresponding shielding layers 109A, 109B exposed from the cables 102A, 102B (refer to FIG. 10A). Then, the box main body 122 is moved from the side of the cable 102B to the side of the cable 102A so as to cover the cable connecting main body 101 thereby, thus the box main body 122 is engaged into the flange portion 120A to be fixed thereto (refer to FIG. 10B). The coffin box 123 for receiving the cable connecting main body 101 is thus manufactured as one unit.

The anticorrosive tapes 108A, 108B and 108C are wound around the cable ports 103A, 103B and the retrieving tube 121 for the grounding cable respectively to effect an anticorrosive treatment (refer to FIG. 10C). The anticorrosive treatment can effectively prevent the water from infiltrating into the coffin box 123. A water-proof mixture 107 is filled through pouring ports (not shown) into the coffin box 123. The water-proof mixture is poured in a liquid state, and is hardened to a rubber state to cover the cable connecting main body 101. Thus, the cable connecting structure is manufactured.

In the conventional cable connecting structure, the retrieving tube 121 for the grounding cable protrudes outward the coffin box 123 and has a relatively long length in order to easily winding the anticorrosive tape 108C, 108A around the retrieving tube 121 or the cable port 103 which is near the retrieving tube. Furthermore, the retrieving tube 121 is formed so as to be inclined from the longitudinal axis of the coffin box, as shown in FIGS. 10A, 10B, 10C. However, the above-mentioned cable connecting structure has a problem in which the retrieving tube protruding outward is likely broken by the load when the coffin box is buried under the ground. The retrieving tube is formed to be short in order to avoid the above-mentioned problem, the interference of the cable port 103A causes the winding to be very difficult, thus resulting in insufficient sealing. The insufficient sealing causes the water infiltration from the retrieving tube into the connected portion of the cable to lead to an accident due to the insulating defection.

Thus, the conventional cable connecting structure has a problem in reliability. If a large size of the coffin box with thick width is manufactured, the retrieving tube with strong construction may be provided to secure the reliability. However, it requires a wide space for installing and increases the cost, thus not preferable.

In addition, since the cable conductor generates heat of about 90° C. when the cable is used in the conventional coffin box, the water-proof mixture filled in the coffin box or air is thermally expanded to cause the inner pressure to rise. The rising of the inner pressure likely causes the breakage of the connecting portion (joint of the flange) of the coffin box or the anticorrosion-treated portion in the water-proof mixture pouring port, thus lowering water-proof ability of the coffin box to result in an accident. Thus, the improvement is expected.

In order to avoid the breakage due to the rising of the inner pressure, it is considered that the joint portion of the coffin box or the water-proof mixture pouring port is formed by pressure proof construction. This causes a larger size of the coffin box and requires a higher cost, thus not preferable.

Japanese Utility Model publication No. Hei 6-046193 discloses a method in which a rubber type elastic material is mixed into the water-proof mixture (compound) filled in the protective box for protecting the connected portion of the cable. According to the method, it is suggested when the temperature of the connected portion of the cable rises to thermally expand the water-proof mixture, the rubber type elastic material shrinks and absorbs the expanded portion of the water-proof mixture.

However, the method as disclosed in Japanese Utility Model publication No. Hei 6-046193 has a problem in which the expanded volume of the water-proof mixture cannot be sufficiently absorbed by the rubber type elastic material, when the water-proof mixture is thermally expanded to a certain extent. Thus, the rising of the inner pressure of the coffin box is not sufficiently prevented in the conventional coffin box.

In view of the above-mentioned problems, one of the object of the present invention is to provide a cable connecting structure which effectively avoid the rising of the inner pressure of the coffin box due to the temperature rise of the cable conductor, and is compact and excellent in reliability.

SUMMARY OF THE INVENTION

In order to overcome the conventional problems, intensive studies have been made. As a result, it was found that a breakage of the tube for retrieving the grounding cable or insufficient sealing can be prevented from occurring, and the intrusion of water in a connected portion of the cable can be effectively prevented from the tube for retrieving the grounding cable, when a main portion of the tube for retrieving the grounding cable is installed so as to protrude inward the coffin box (cable accommodating box) in place of protruding outward the coffin box, and the tube for retrieving the grounding cable in the second flange portion is sealed in watertight at a vicinity of inner end portion of the tube located within the cable accommodating box after the grounding cable is retrieved through the tube to outside of the cable accommodating box.

Furthermore, it was found that the thermal expansion of the water proof mixture filled in the coffin box can be absorbed when a prescribed cushion material is installed within the coffin box, thus enable to effectively prevent the inner pressure of the coffin box from rising beyond an acceptable level.

The present invention was made based on the above findings.

The first embodiment of a cable connecting structure comprises a cable connecting structure, which includes a cable accommodating box comprising:

a box main body in which a connected portion of two cables is accommodated;

a first flange portion which is attached to one end of said box main body, and includes a first cable port through which one of said two cables is received; and a second flange portion which is attached to other end of said box main body, and includes a second cable port through which other of said two cables is received, and a tube portion for retrieving a grounding cable, a main portion of which protrudes inward said box main body.

The second embodiment of a cable connecting structure comprises a cable connecting structure, which includes:

a cable accommodating box comprising a box main body in which a connected portion of two cables is accommodated, a first flange portion which is attached to one end of said box main body, and includes a first cable port through which one of said two cables is received, and a second flange portion which is attached to other end of said box main body, and includes a second cable port through which other of said two cables is received, and a tube portion for retrieving a grounding cable, a main portion of which protrudes inward said box main body; and a cushioning material installed within said cable accommodating box for absorbing a thermal expansion of a water proof mixture filled in said cable accommodating box.

In a third embodiment of a cable connecting structure, said first cable port and said second cable port in the respective first flange portion and second flange portion of said cable accommodating box are sealed in watertight after respective cables are received therein, and said tube for retrieving said grounding cable in said second flange portion is sealed in watertight at a vicinity of one end portion of said tube located within said cable accommodating box after said grounding cable is retrieved through said tube to outside of said cable accommodating box.

In a fourth embodiment of a cable connecting structure, said first cable port and said second cable port in the respective first flange portion and second flange portion of said cable accommodating box are sealed in watertight after respective cables are received therein, and said tube for retrieving said grounding cable in said second flange portion is sealed in watertight at a vicinity of one end portion of said tube located within said cable accommodating box after said grounding cable is retrieved through said tube to outside of said cable accommodating box.

In a fifth embodiment of a cable connecting structure, at least one of said first flange portion and said second flange portion are integrally formed with said box main body.

In a sixth embodiment of a cable connecting structure, said box main body and the first flange portion and the second flange portion are integrally formed and said cable accommodating box which is cut along a longitudinal axis thereof in to two facing corresponding parts is used.

In a seventh embodiment of a cable connecting structure, a cushioning material for absorbing a thermal expansion of a water proof mixture filled in said cable accommodating box is installed within said box main body.

In an eighth embodiment of a cable connecting structure, said cushioning material comprises a sheet type cushioning material, and said sheet type cushioning material is installed in a vicinity of at least one flange portion in such a manner that a surface of said sheet type cushioning material is perpendicular to an axis of said cable.

In a ninth embodiment of a cable connecting structure, a volume of said cushioning material corresponds to a difference between a volume of said water proof mixture at a temperature when the cable is used and a volume of said water proof mixture at a temperature when filled in the cable accommodating box.

In a tenth embodiment of a cable connecting structure, said cushioning material comprises a polymeric foam.

In an eleventh embodiment of a cable connecting structure, said tube portion for retrieving the grounding cable is installed in the flange portion in such a manner that a longitudinal axis of said tube portion is in parallel to a longitudinal axis of said box main body.

In a twelfth embodiment of a cable connecting structure, an entire of said tube portion for retrieving the grounding cable is positioned substantially within said cable accommodating box.

DETAILED DESCRIPTION OF THE INVENTION

Preferred embodiments of the invention are described in detail with reference to the drawings.

A cable connecting structure of the invention comprises a cable connecting structure, which includes a cable accommodating box comprising: a box main body in which a connected portion of two cables is accommodated; a first flange portion which is attached to one end of said box main body, and includes a first cable port through which one of said two cables is received; and a second flange portion which is attached to other end of said box main body, and includes a second cable port through which other of said two cables is received, and a tube portion for retrieving a grounding cable, a main portion of which protrudes inward said box main body.

According to the above embodiment, since the tube portion for retrieving a grounding cable is installed within the box main body, it is possible to prevent the tube portion from being broken, and furthermore, it is possible to effectively and sufficiently seal the cable accommodating box (i.e., coffin box).

The above-mentioned grounding cable comprises a grounding cable which is pulled out of the cable accommodating box for earthing the cable connecting portion.

Figure 1:
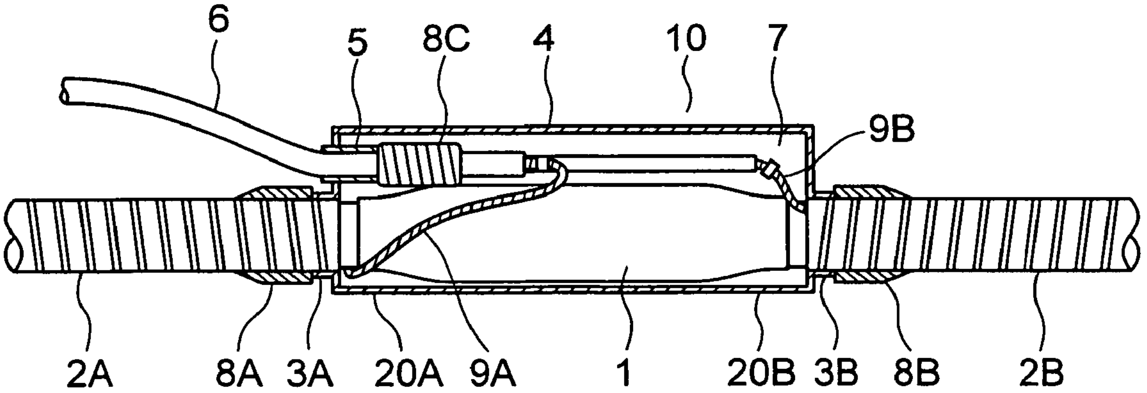
FIG. 1 is a descriptive view to show a cable connecting structure of the present invention.

FIG. 1 is a descriptive view to show a cable connecting structure of the present invention. A cable connecting main body 1 as shown in FIG. 1 comprises a portion in which respective conductors of a cable 2A and a cable 2B are connected and covered on outer periphery thereof by a reinforcing insulating layer comprising rubber block. The cable connecting main body 1 is received within a coffin box (i.e., a cable accommodating box) 10.

The coffin box 10 includes a box main body 4, flange portions 20A, 20B which are connected to the respective end of the box main body 4. The box main body 4 comprises for example a cylindrical component. However, a shape of the box main body 4 is not limited to cylindrical, but any shape which has a small fluid resistance such as elliptic in cross section may be used as for the box main body. One of the flange portion (i.e., second flange portion) 20A includes a cable port 3A and a tube portion 5 for retrieving a grounding cable, and the other flange portion (i.e., first flange portion) 20B includes a cable port 3B. The box main body and the flange portions may be formed separately or integrally, furthermore, the box main body may integrally formed with one of the flange portions.

As shown in FIG. 1, the tube portion 5 for retrieving a grounding cable is installed in a vicinity of the cable port 3A so as to protrude into the coffin box. More specifically, an essential portion of the tube portion for retrieving a grounding cable is located within the box main body. In this embodiment, the tube portion for retrieving a grounding cable is formed by fixing a pipe to the flange portion 20A. Since the coffin box of the invention is formed by combining a cylindrical coffin box and the pipe, i.e., installing the pipe in the flange portion as the tube portion for retrieving a grounding cable, it is possible to manufacture the coffin box at low cost. The flange portion and the tube portion for retrieving a grounding cable may be integrally formed by extruding or the like. The pipe may be installed in the flange portion so that a longitudinal axis of the tube portion for retrieving a grounding cable is in parallel to a longitudinal axis of the box main body.

The grounding cable 6 is connected to the shielding layers 9A, 9B in the vicinity of the cable connecting main body 1. The grounding cable 6 is pulled out of the coffin box 10 through the tube portion 5 for retrieving a grounding cable. The vacant space within the coffin box 10 is filled with a water proof mixture 7.

Each end portion of the cable port 3A, 3B and the tube portion 5 for retrieving a grounding cable is wound by an anticorrosive tape 8A, 8B, 8C respectively. Thus, the coffin box is sealed in the cable port and the tube portion from the cables 2A, 2B and the grounding cable 6 respectively.

Since the essential portion of the tube portion 5 for retrieving a grounding cable is installed within the coffin box, and thus the tube portion does not substantially protrude outward the coffin box, the winding of the anticorrosive tape 8C around the tube portion 5 is not interfered by cable port 3A, resulting in remarkable improvement in workability of the winding. Thus, the sealing between the end portion of the tube portion 5 and the grounding cable 6 is highly secured.

Furthermore, even though the length of the tube portion 5 for retrieving a grounding cable is sufficiently long for a easy winding of the anticorrosive tape 10, the tube portion is not broken when it is buried under the ground, because substantially the entire tube portion is protruded within the coffin box and protected. A part of the tube portion 5 may be protruded out of the coffin box 10, if the length of the part is sufficiently small so that the part causes no trouble.

As described above, the cable connecting structure may prevent water from infiltrating into the coffin box, thus remarkably reliable.

The cable connecting structure of the invention in which the essential portion of the tube portion for retrieving a grounding cable is installed within the coffin box is described in detail by the examples.

EXAMPLE 1

A method for manufacturing a cylindrical coffin box is described as the example 1 with reference to FIGS. 2 to 4.

Figure 2A:
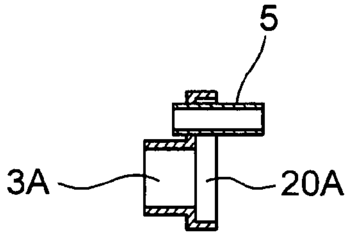
FIG. 2A to 2C are descriptive views to show a method for manufacturing the cable connecting structure of an example 1 of the present invention.

As shown in FIG. 2A, a cable port 3A and a tube portion 5 for retrieving a grounding cable are arranged in a flange portion 20A made of FRP (Fiber Reinforced Plastic) in such manner that the cable port and the tube portion extend in opposite directions each other from the face of the flange portion 20A.

Figure 2B:
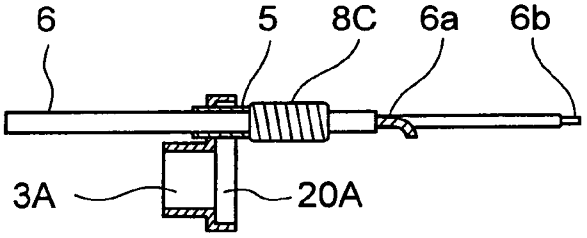

As shown in FIG. 2B, the grounding cable 6 is inserted through the tube portion 5 for retrieving a grounding cable, and then the anticorrosive tape 8C is wound around the end portion of the tube portion 5 and the vicinity thereof, thus the anticorrosive treatment is effected. The grounding cable is cut at an appropriate portion so that an outer conductor layer 6*a* and an inner conductor layer 6*b* are exposed from an end portion of a sheath layer of the grounding cable 6.

Figure 2C:
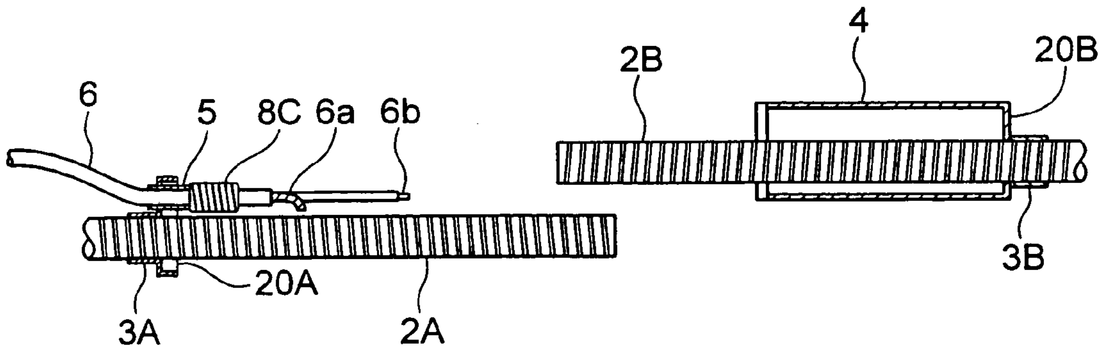

As shown in FIG. 2C, the cable 2A to be connected is inserted through the cable port 3A of the flange portion 20A. The other flange portion 20B is attached to the cylindrical box main body 4 made of FRP, and then the cable 2B to be connected is inserted through the cable port 3B of the flange portion 20B.

Figure 3A:
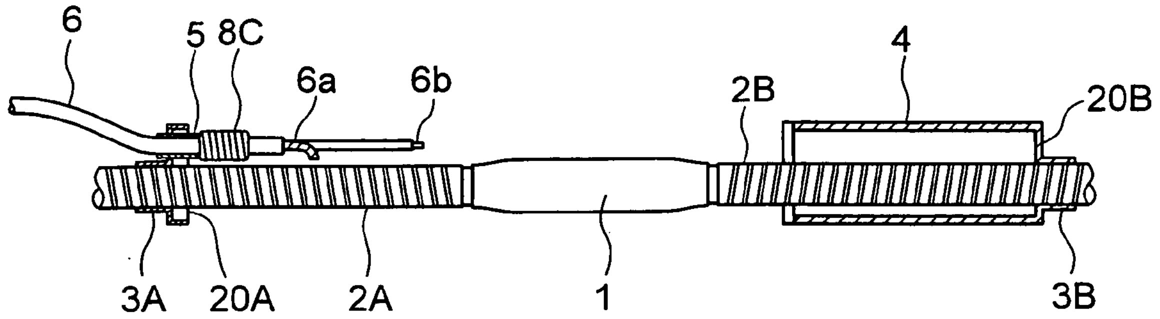
FIG. 3A to 3C are descriptive views to show a method for manufacturing the cable connecting structure of an example 1 of the present invention.
Figure 4A:
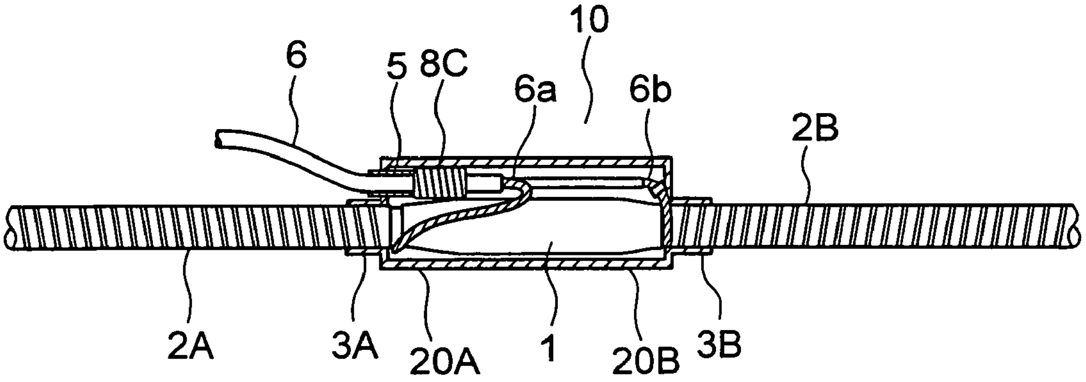
FIGS. 4A and 4B are descriptive views to show a method for manufacturing the cable connecting structure of an example 1 of the present invention.

After the conductors of the cables 2A, 2B, the insulating layer and the shielding layer which cover around the conductors are sequentially strip-treated in step manner, the conductors are connected using a conductor-connecting ferrule or the like, and then a reinforced insulating layer such as a rubber block is attached around the conductor-connecting ferrule to form the cable connecting main body 1 (refer to FIG. 3A).

Figure 3B:
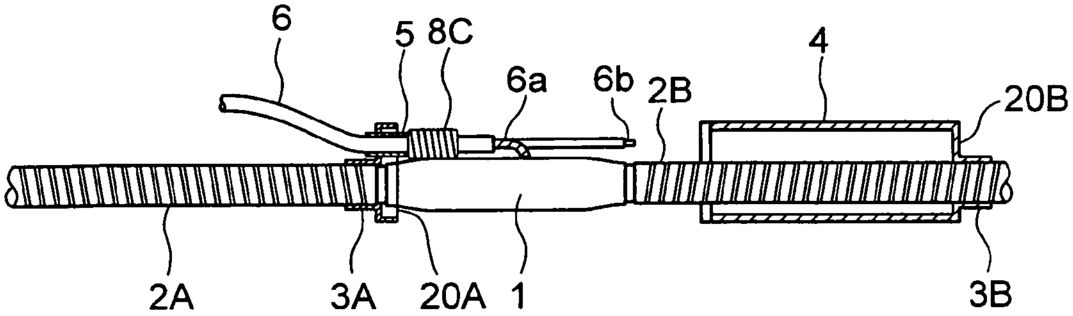
Figure 3C:
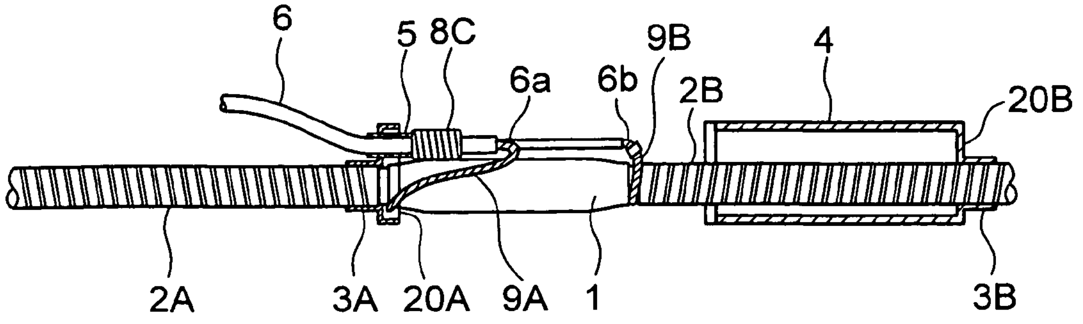

Then, the flange portion 20A is moved to the vicinity of the cable connecting main body 1 (refer to FIG. 3B). The shielding layers 9A, 9B exposed from the cables 2A, 2B are connected to the outer conductor layer 6*a* and the inner conductor layer 6*b* of the grounding cable respectively (refer to FIG. 3C). Then, the box main body 4 is moved from the side of the cable 2B to the side of the cable 2A so as to cover the cable connecting main body 1 thereby, thus the box main body 4 is engaged into the flange portion 20A to be fixed thereto. The coffin box 10 for receiving the cable connecting main body 1 is thus manufactured as one unit (refer to FIG. 4A).

Figure 4B:
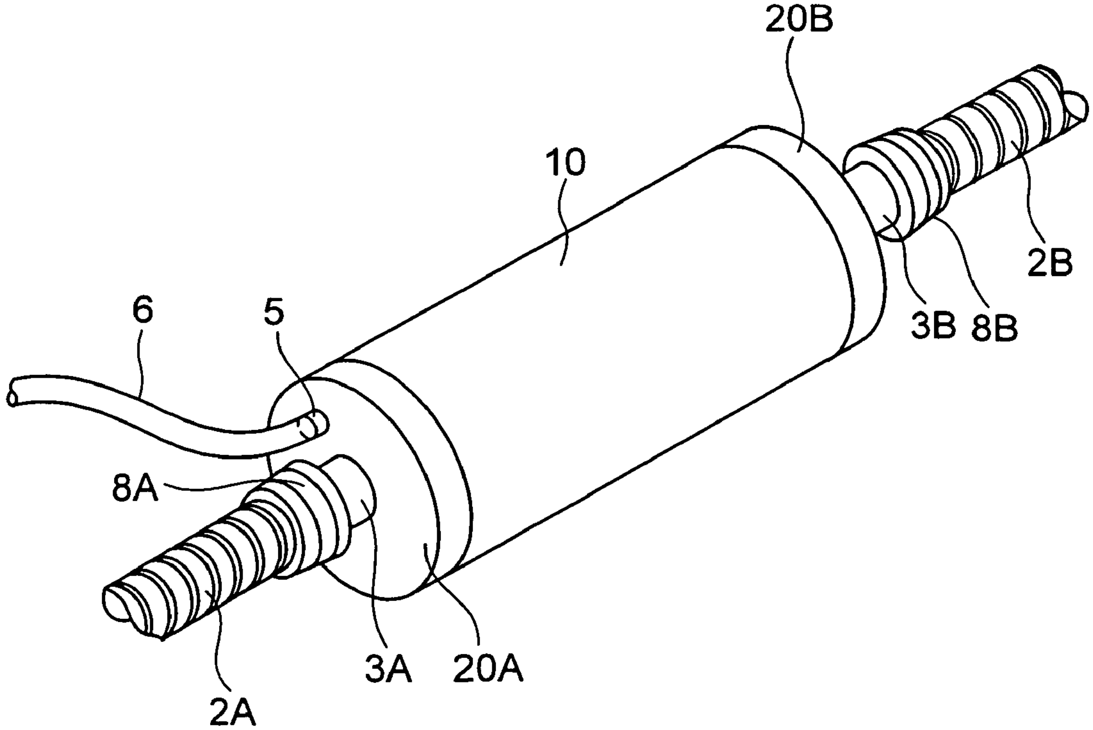

As shown in FIG. 4B which is an outer oblique appearance of the cable connecting structure, the anticorrosive tapes 8A, 8B are wound around the cable ports 3A, 3B respectively to effect an anticorrosive treatment. The anticorrosive treatment can effectively prevent the water from infiltrating into the coffin box 10. The water proof mixture is filled through pouring ports (not shown) into the coffin box 10 and the pouring ports are sealed. Thus, the cable connecting structure is manufactured.

EXAMPLE 2

The cable connecting structure using the cylindrical coffin box is explained in example 1. A method for manufacturing the cable connecting structure using the coffin box is explained in example 2, the coffin box of which is cut into two facing portions with reference to FIGS. 5A to 5C, and FIG. 6.

Figure 5A:
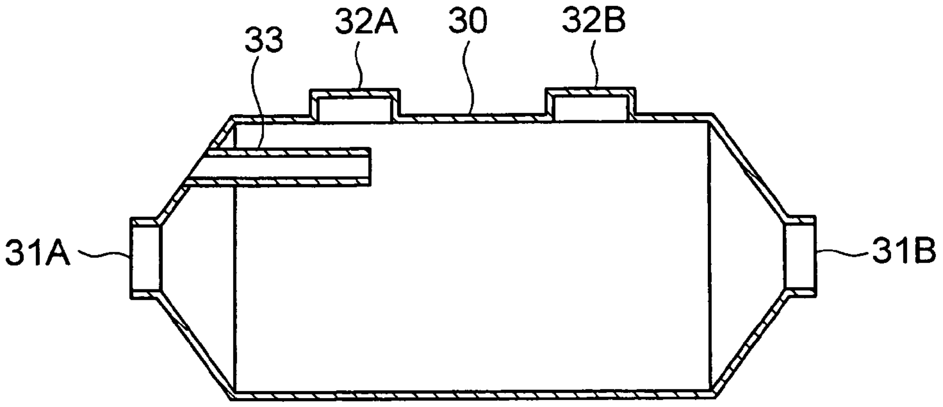
FIG. 5A to 5G are descriptive views to show a method for manufacturing the cable connecting structure of an example 2 of the present invention.

The coffin box used in this example comprises a cylindrical portion and two approximately corn-shaped portions which are fixed to the respective end portions of the cylindrical portion. Before combined, the coffin box is cut vertically along the longitudinal axis thereof into two facing portions (i.e., coffin box pieces) each of which has approximately a boat form shape. FIG. 5A shows a side view of the coffin box piece 30 of the boat form shape. The coffin box piece 30 has respective cable port 31A, 31B at the ends thereof, each of which has a half cylindrical shape. Water proof mixture pouring ports 32A, 32B are installed on the upper side of the respective coffin box pieces. The tube portion 33 for retrieving a grounding cable is installed in the vicinity of the cable port 31A in the approximately corn portion in such manner that the tube portion protrudes inward the inside of the coffin box.

The cable ports 31A, 31B and the water proof mixture pouring ports 32A, 32B are installed in such manner that the respective half peripheries of the open regions of the cable port and the water proof mixture pouring ports belong to the coffin box piece 30 and the remaining half peripheries belong to the other coffin box piece (not shown) described hereunder. The tube portion 33 for retrieving a grounding cable may be formed integrally with the coffin box piece 30, or the pipe is attached to the corn portion by means of adhesive material or the like.

Figure 5B:
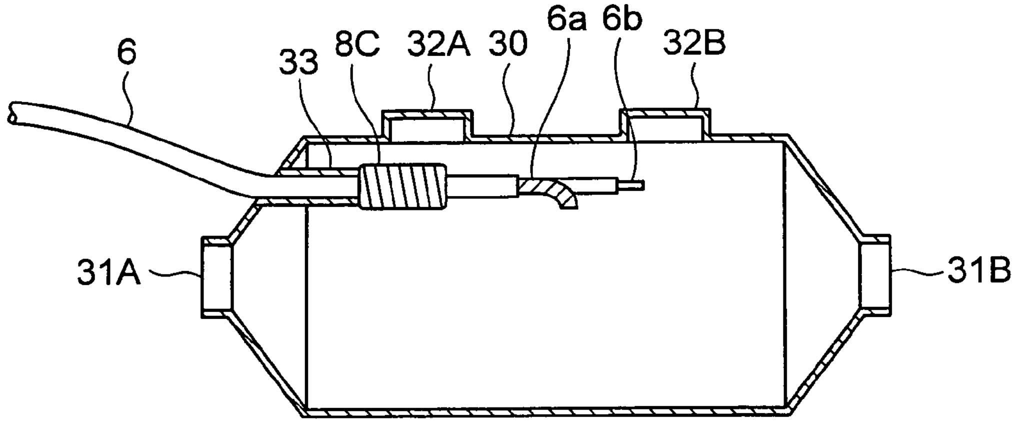
Figure 5C:
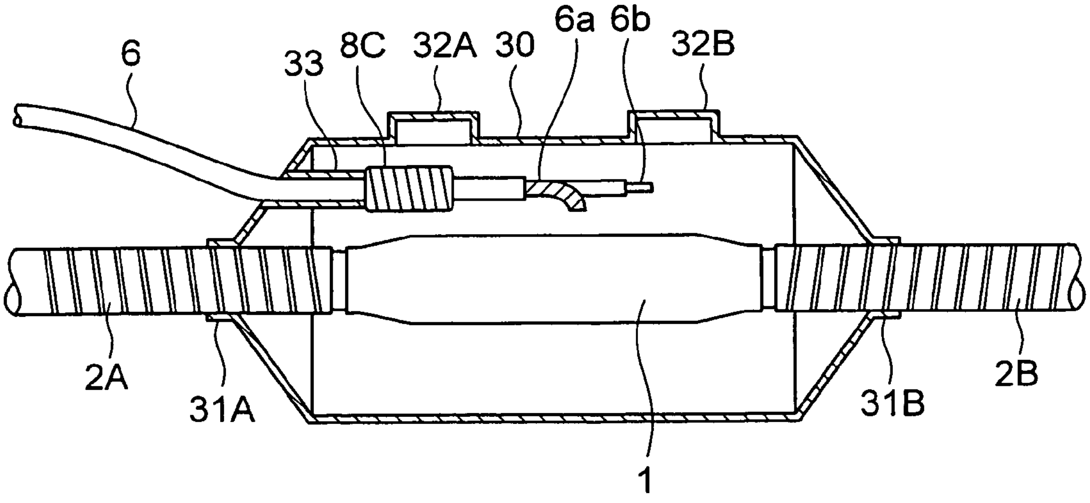

As shown in FIG. 5B, after the grounding cable is inserted through the tube portion 33 for retrieving a grounding cable, the anticorrosive tape 8C is wound around the end portion of the tube portion 33 and the vicinity thereof to securely seal between the tube portion and the grounding cable. When winding the anticorrosive tape, since the water proof mixture pouring port 32A is located in the vicinity of the end portion of the tube portion 33 to form a space between the tube portion and the water proof mixture pouring port, the tape can be effectively wound using thus formed space. The grounding cable 6 is cut at an appropriate portion so that an outer conductor layer 6*a* and an inner conductor layer 6*b* are exposed from an end portion of a sheath layer of the grounding cable 6.

Then, after the respective insulating layers and shielding layers of the cables 2A and 2B are sequentially strip-treated in step manner, the conductors are connected using a conductor-connecting ferrule or the like, and then a reinforced insulating layer such as a rubber block is attached around the conductor-connecting ferrule to form the cable connecting main body 1. The cables 2A, 2B are arranged so as to be fit into the respective cable ports 31A, 31B so that the cable connecting main body 1 is received in the coffin box piece 30 (refer to FIG. 5C). Furthermore, the outer conductor layer 6*a* and the inner conductor layer 6*b* are connected respectively to the corresponding shielding layers 9A, 9B exposed from the cables 2A, 2B (refer to FIG. 6A).

Figure 6A:
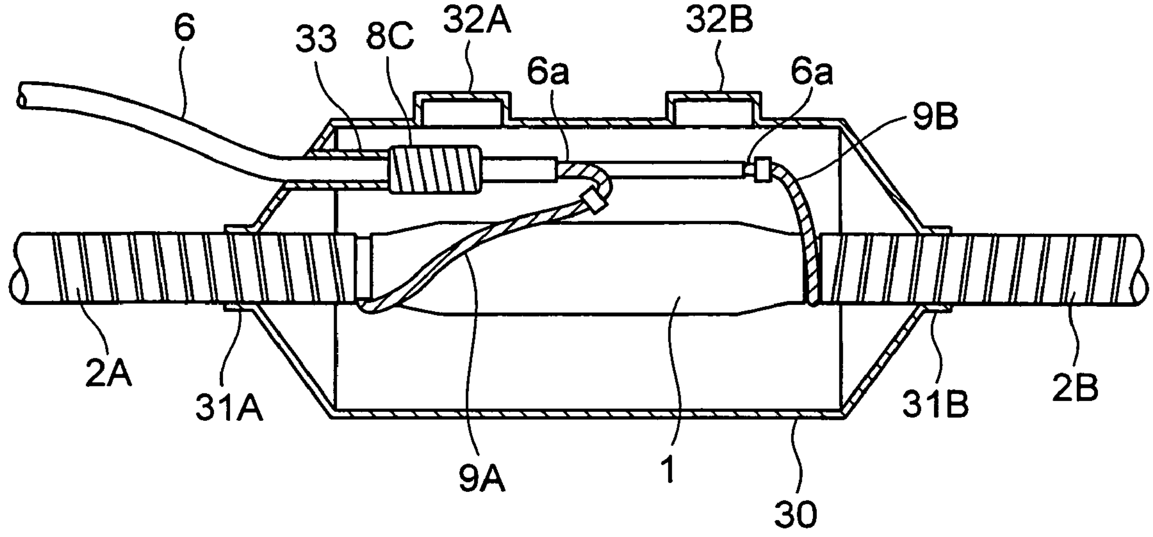
FIGS. 6A and 6B are descriptive views to show a method for manufacturing the cable connecting structure of an example 2 of the present invention.
Figure 6B:
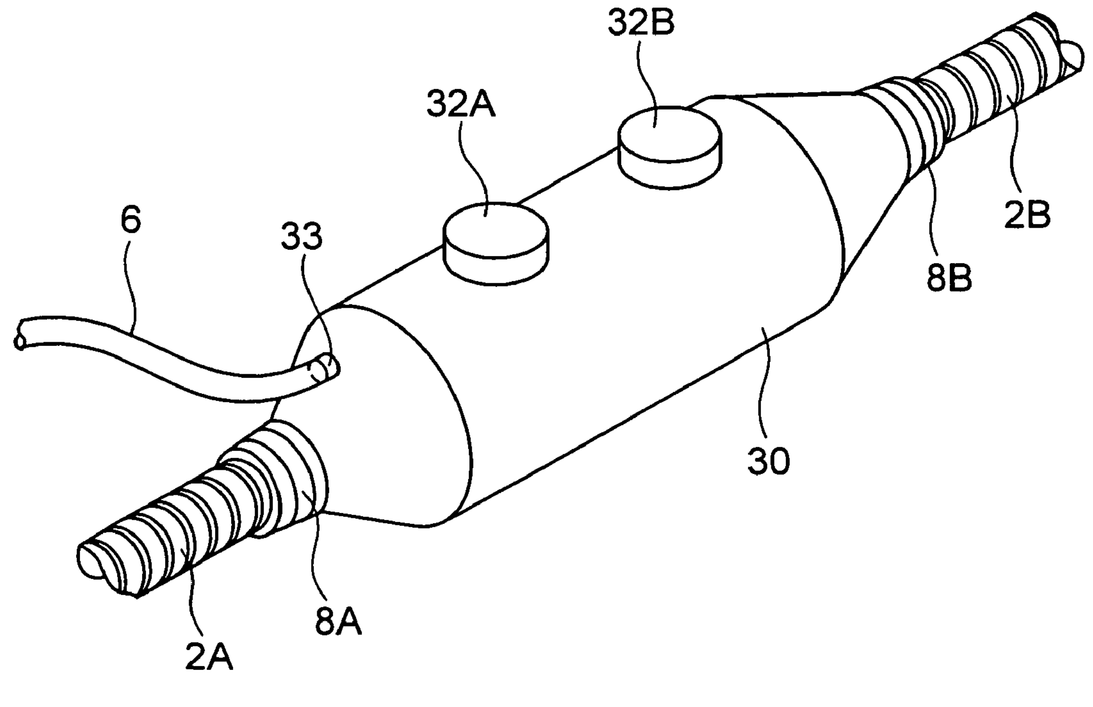

After the other coffin box piece (not shown) is faced and engaged to the coffin box piece 30 to be fixed, the anticorrosive tapes 8A, 8B are wound around the respective cable ports 31A, 31B to effect an anticorrosive treatment, as shown in FIG. 6B. The water-proof mixture is filled through the pouring ports 32A, 32B into the coffin box and the pouring ports are sealed. Thus, the cable connecting structure is manufactured.

Another method for manufacturing the cable connecting structure using the coffin box is explained, the coffin box of which is cut into two facing portions, with reference to FIGS. 5D to 5G, and FIG. 6B.

Figure 5D:
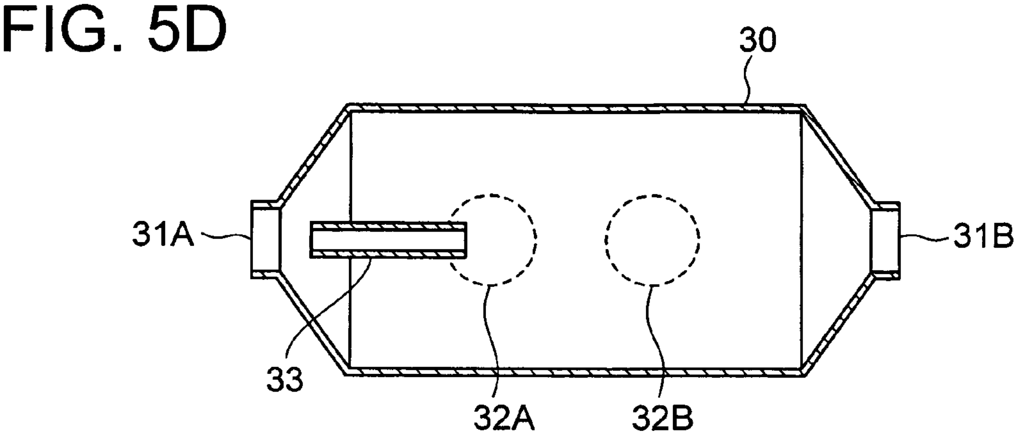

The coffin box used in this example comprises a cylindrical portion and two approximately corn-shaped portions which are fixed to the respective end portions of the cylindrical portion. Before combined, the coffin box is cut horizontally along the longitudinal axis thereof into two facing portions (i.e., coffin box pieces) each of which has approximately a boat form shape. FIG. 5D shows a plan view of the coffin box piece 30 of the boat form shape which is placed in such manner that the inside of the coffin box piece faces upward. The coffin box piece 30 has respective cable port 31A, 31B at the ends thereof, each of which has a half cylindrical shape. Cylindrical water-proof mixture pouring ports 32A, 32B are installed on the coffin box piece, as depicted in the dashed circle line in the drawing. The tube portion 33 for retrieving a grounding cable is installed in the vicinity of the center portion of the cable port 31A (as shown in FIG. 5D) in the approximately corn portion in such manner that the tube portion protrudes inward the inside of the coffin box.

The cable ports 31A, 31B are installed in such manner that the respective half peripheries of the open regions of the cable ports belong to the coffin box piece 30 and the remaining half peripheries belong to the other coffin box piece described hereunder. The tube portion 33 for retrieving a grounding cable may be formed integrally with the coffin box piece 30, or the pipe is attached to the corn portion by means of adhesive material or the like.

Figure 5E:
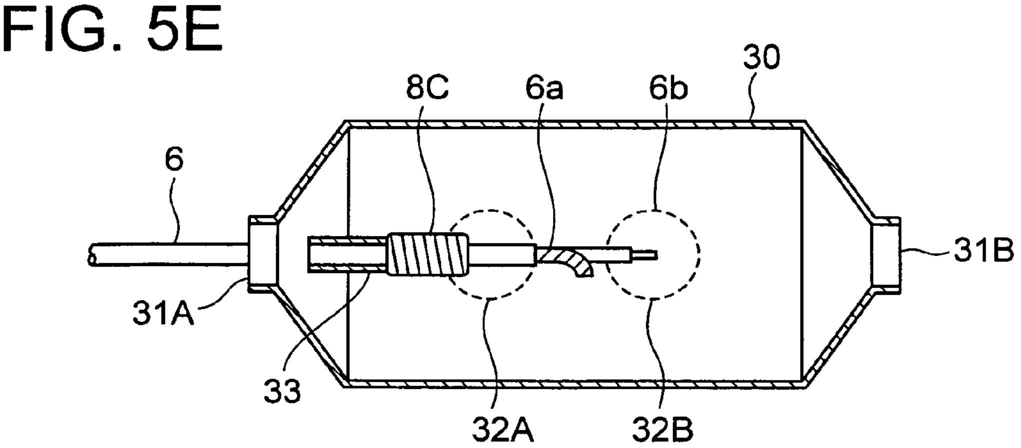
Figure 5F:
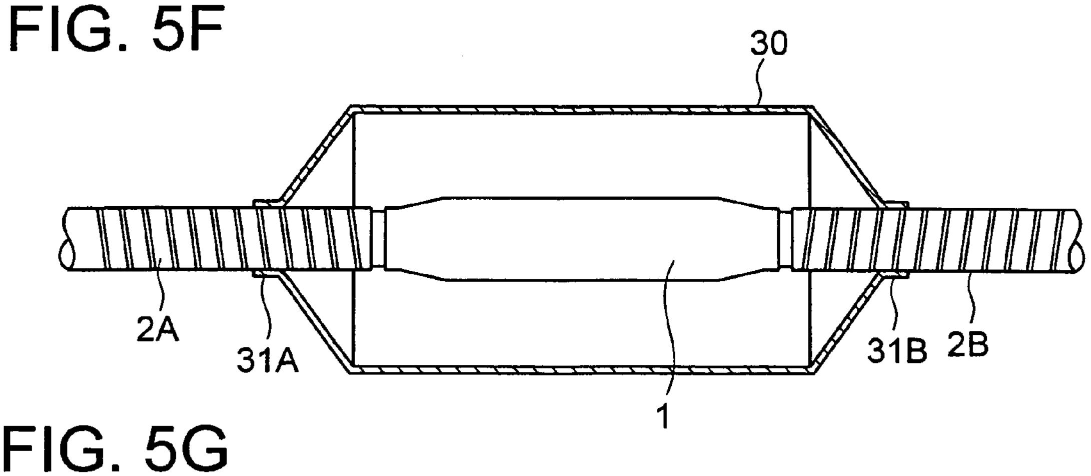
Figure 5G:
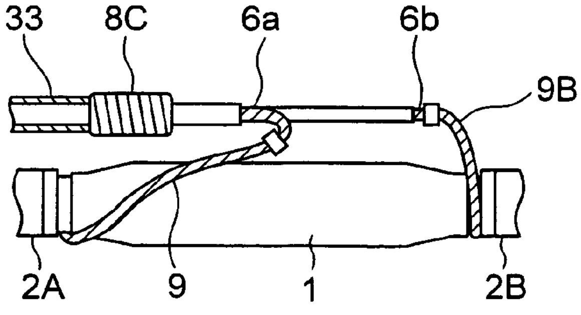

As shown in FIG. 5E, after the grounding cable 6 is inserted through the tube portion 33 for retrieving a grounding cable, the anticorrosive tape 8C is wound around the end portion of the tube portion 33 and the vicinity thereof to securely seal between the tube portion and the grounding cable. When winding the anticorrosive tape, since the water proof mixture pouring port 32A is located in the vicinity of the end portion of the tube portion 33 to form a space between the tube portion and the water proof mixture pouring port, the tape can be effectively wound using thus formed space. The grounding cable 6 is cut at an appropriate portion so that an outer conductor layer 6*a* and an inner conductor layer 6*b* are exposed from an end portion of a sheath layer of the grounding cable 6.

Then, after the respective insulating layers and shielding layers of the cables 2A and 2B are sequentially strip-treated in step manner, the conductors are connected using a conductor-connecting ferrule or the like, and then a reinforced insulating layer such as a rubber block is attached around the conductor-connecting ferrule to form the cable connecting main body 1. The cables 2A, 2B are arranged so as to be fit into the respective cable ports 31A, 31B so that the cable connecting main body 1 is received in the coffin box piece 30 (refer to FIG. 5F). Furthermore, the outer conductor layer 6*a* and the inner conductor layer 6*b* are connected respectively to the corresponding shielding layers 9A, 9B exposed from the cables 2A, 2B (refer to FIG. 5G).

After the other coffin box piece 30 is faced and engaged to the coffin box piece 30, the anticorrosive tapes 8A, 8B are wound around the respective cable ports 31A, 31B to effect an anticorrosive treatment, as shown in FIG. 6B. The water-proof mixture is filled through the pouring ports 32A, 32B into the coffin box and the pouring ports are sealed. Thus, the cable connecting structure is manufactured.

According to the present invention, since the tube portion protrudes inward the coffin box, while the length of the tube portion for retrieving a grounding cable is maintained sufficiently long for a sealing using the anticorrosive tape, no harmful protruding out of the coffin box is made, thus enabling to obtain the cable connecting structure excellent in reliability. Furthermore, the reliability can be realized without enlarging the coffin box, thus obtaining a compact cable connecting structure at lower cost.

One embodiment of the cable connecting structure of the invention enabling to sufficiently prevent the inner pressure of the coffin box from rising is described hereunder.

One of other embodiment of the cable connecting structure of the invention is a cable connecting structure, which includes:

a cable accommodating box comprising a box main body in which a connected portion of two cables is accommodated, a first flange portion which is attached to one end of said box main body, and includes a first cable port through which one of said two cables is received, and a second flange portion which is attached to other end of said box main body, and includes a second cable port through which other of said two cables is received, and a tube portion for retrieving a grounding cable, a main portion of which protrudes inward said box main body; and a cushioning material installed within said cable accommodating box for absorbing a thermal expansion of a water proof mixture filled in said cable accommodating box.

Figure 7:
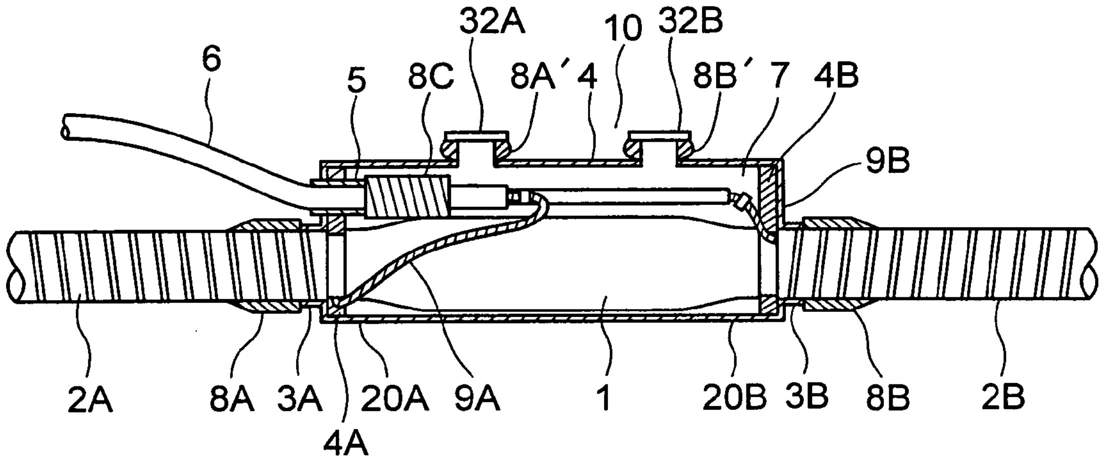
FIG. 7 is a schematic view showing a cable connecting structure of other example of the present invention.

FIG. 7 is a schematic view showing a cable connecting structure of one embodiment of the present invention. In this cable connecting structure, as described with reference to FIG. 1, the cable connecting main body 1 is received in the coffin box 10. The coffin box comprises the box main body 4 and the flange portions 20A, 20B disposed on both ends of the box main body 4. The flange portions 20A, 20B are formed separately from the box main body 4. The cable port 3A and the tube portion 5 for retrieving a grounding cable are installed in the flange portion 20A, and the cable port 3B is installed in the flange portion 20B. The water-proof mixture pouring ports 32A, 32B, which is the same port as shown in FIG. 5, are installed on the upper portion of the box main body 4. The cable connecting main body 1 is received within the coffin box 10 through the cable ports 3A, 3B of the coffin box 10.

The metal cover layers (i.e., shielding layer) 9A, 9B of the cable to be connected are connected to the outer conductor layer and the inner conductor layer of the grounding cable 6, respectively, and the grounding cable 6 is pulled out of the coffin box 10 through the tube portion 5 for retrieving a grounding cable. The anticorrosive tape (8A, 8B, 8C, 8A', 8B') is wound around the cable port 3A, 3B, the tube portion 5 for retrieving a grounding cable, and the water-proof mixture pouring port 32A, 32B, respectively to prevent water from infiltrating into the coffin box 10. The tube portion 5 for retrieving a grounding cable may be installed inside of the coffin box, as shown in FIG. 7. In this case, as shown in FIG. 7, the coffin box is sealed at a portion between the end portion of the tube portion located within the coffin box and in the vicinity thereof and the grounding cable.

The space within the coffin box 10 is filled with the water-proof mixture 7. The water-proof mixture 7 is poured from the water-proof mixture pouring ports 32A, 32B installed in the upper portion of the coffin box 10.

Figure 8:
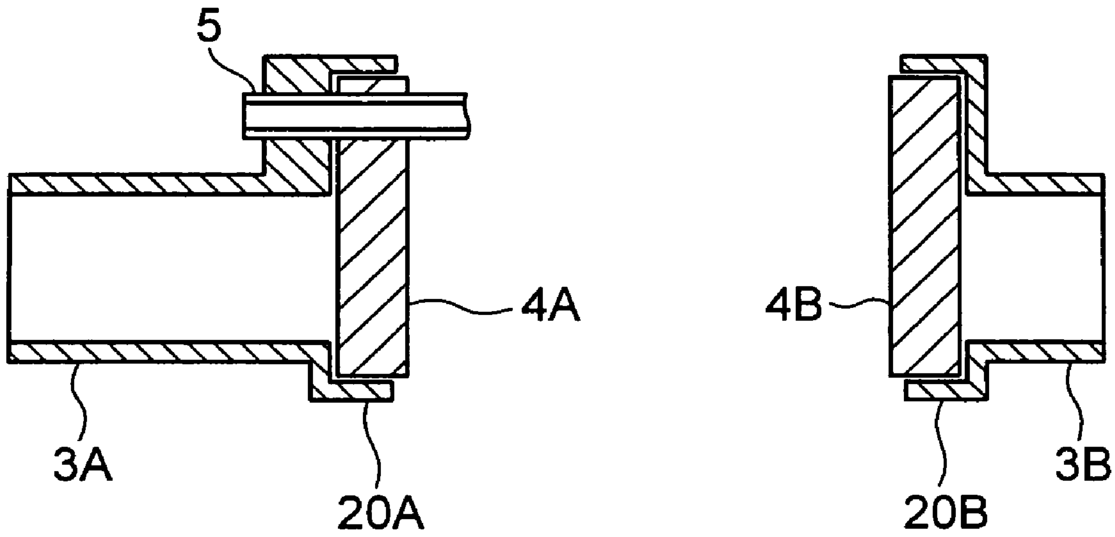
FIG. 8 is a partial enlarged view of FIG. 7 showing a cushioning material.
Figure 9A:
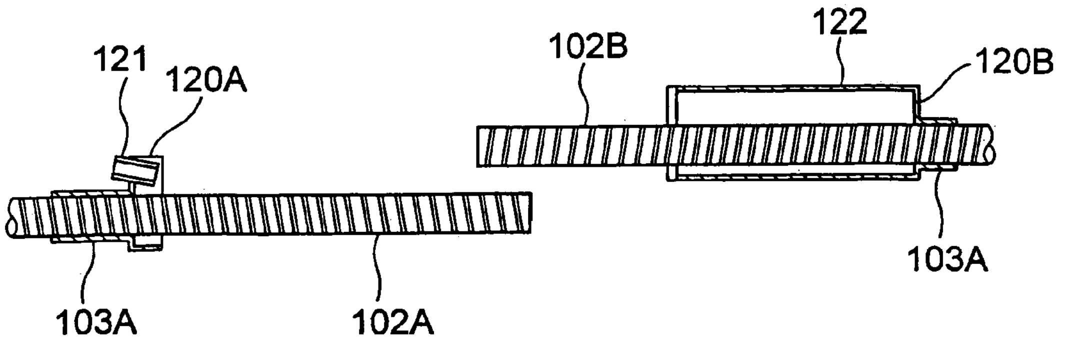
(Prior Art) FIG. 9A
FIG. 9A to 9C are descriptive views to show a method for manufacturing the conventional cable connecting structure.
Figure 9B:
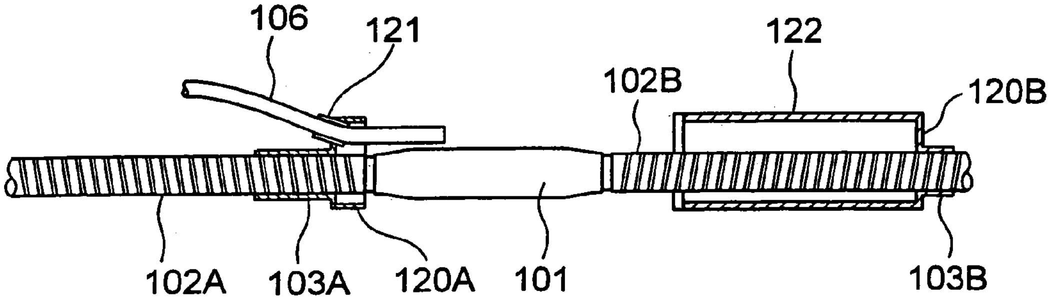
(Prior Art) FIG. 9B
Figure 9C:
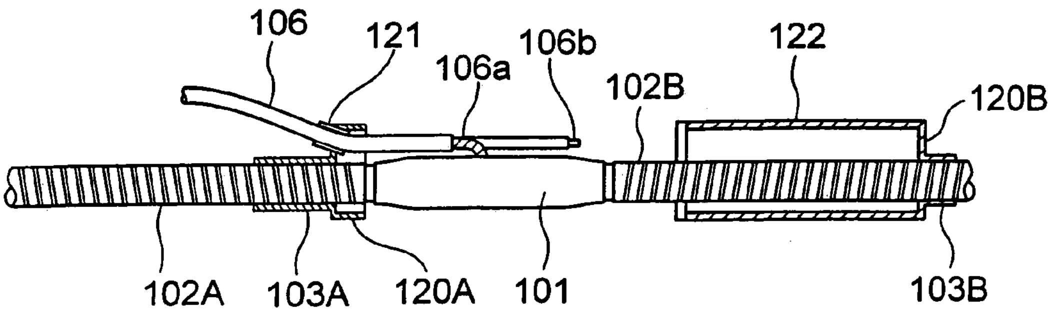
(Prior Art) FIG. 9C
Figure 10A:
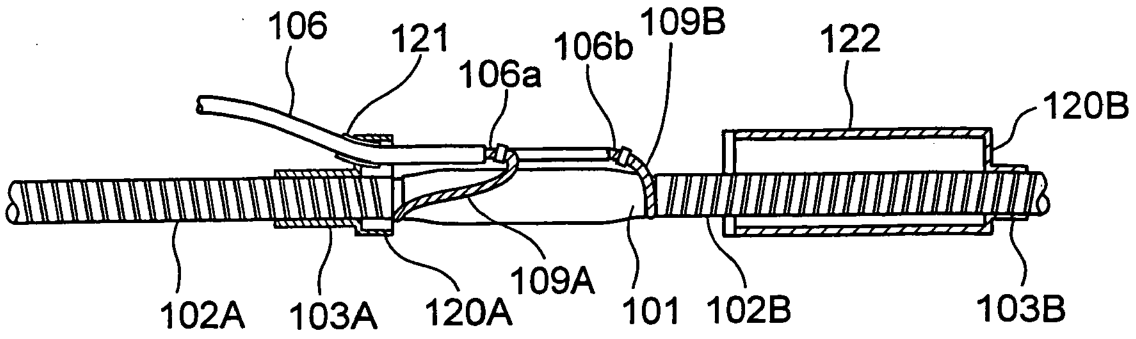
(Prior Art) FIG.10A
FIG. 10A to 10C are descriptive views to show a method for manufacturing the conventional cable connecting structure.
Figure 10B:
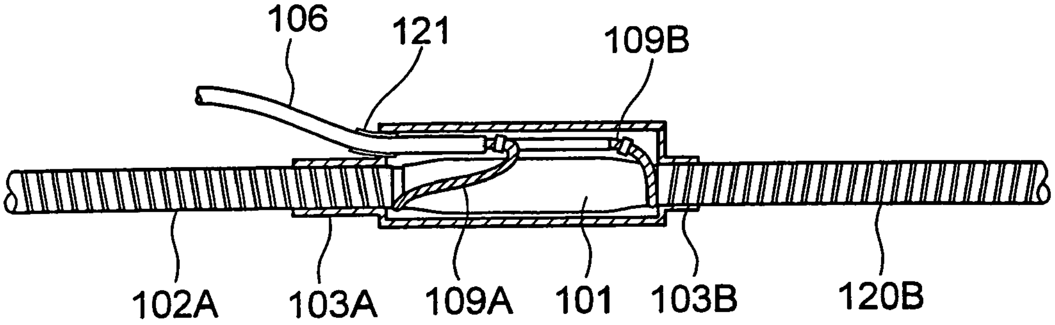
(Prior Art) FIG.10B
Figure 10C:
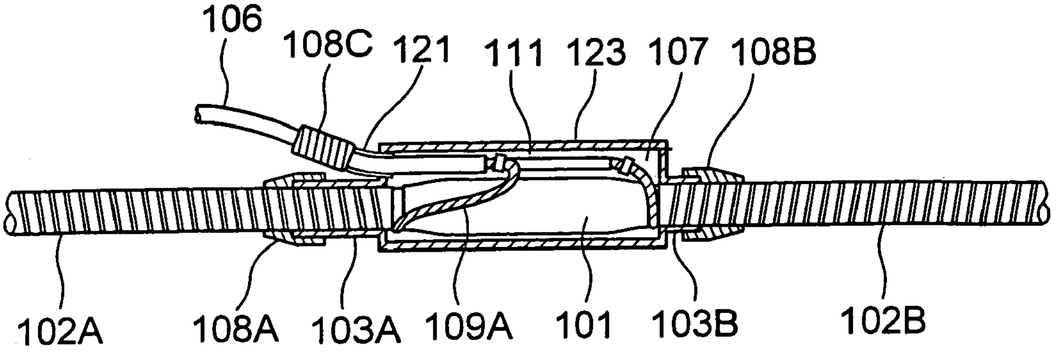
(Prior Art) FIG.10C

FIG. 8 is a partial enlarged view showing a cushioning material arranged in close to the flange portion. As shown in FIG. 8, the cushioning material 4A, 4B made of foam polyethylene are arranged in both end portions of the coffin box. The cushioning material 4A, 4B comprises a sheet type material having the same cross sectional area as that of the coffin box, and the sheet type material is arranged so that the face of the sheet type material is perpendicular to the axis direction of the cable. The amount of the cushioning material (in other words, thickness of the sheet type material) is preferably smaller from the heat dissipating point of view. The necessary amount for the cushioning material is described hereunder.

It is preferable that the water-proof mixture is filled within the coffin box so that there is no vacant space within the coffin box. However, the water-proof mixture is thermally expanded due to the temperature rise of the water-proof mixture when the cable is used. The vacant space should be fully filled at the condition in which the water-proof mixture is thermally expanded. When the temperature at the time that the cable is used is set to be 90° C., the volume (V(m) 90° C.) of the water-proof mixture at the temperature of 90° C. is expressed as follows:

$$V(m)90^\circ\ C.=V(coff) \quad (1)$$

where, V(coff) is a volume of the vacant space within the coffin box.

When the temperature at the time that the water-proof mixture is filled is set to be 25° C., there exists a volume difference between V(m) 25° C. and V(m) 90° C. The above-mentioned volume difference is to be filled with the cushioning material so that the thermal expansion of the water-proof mixture is absorbed by the cushioning material. This situation is expressed as follows:

$$V(m)25°\ C.+V(\text{cush})25°\ C.=V(\text{coff}) \quad (2)$$

Where, V(m) 25° C. is the volume of the water-proof mixture at the temperature of 25° C., V(cush) 25° C. is the volume of the cushioning material at the temperature of 25° C., and V(coff) is a volume of the vacant space within the coffin box.

From the equation (2), $$\begin{aligned} V(cush)\ 25°\ C. &= V(coff) - V(m)\ 25°\ C. \quad (3) \\ &= V(coff)\{1 - V(m)\ 25°\ C./V(coff)\} \end{aligned}$$

Considering the equation (1), $$V(\text{cush})25°\ C.=V(\text{coff})\{1-V(m)25°\ C./V(m)90°\ C.\} \quad (4)$$

Applying a linear thermal expansion coefficient á and the temperature difference ÄT (=90° C.−25° C.), V(m) 90° C. is expressed as follows:

$$V(m)90°\ C.=V(m)25°\ C.(1+3á.ÄT) \quad (5)$$

From the equation (4), $$\begin{aligned} V(cush)\ 25°\ C. &= V(coff)\{1 - 1/(1 + 3á.\ ÄT)\} \quad (6) \\ &= V(coff)\{3\ á.ÄT/(1 + 3á.\ ÄT)\} \end{aligned}$$

Since 3á.ÄT is sufficiently small compared to 1, from the equation (6), $$V(\text{cush})25°\ C.\approx V(\text{coff}).3á.ÄT \quad (7)$$

The cushioning material having a volume satisfying the equation (7) should be used.

For example, when the linear thermal expansion coefficient á of the water-proof mixture is 1.4×10−4 (1/° C.), the equation (7) is expressed as follows:

$$\begin{aligned} V(cush)\ 25°\ C. &\approx V(coff) \times (3 \times 1.4 \times 10 - 4) \times (90 - 25) \\ &= V(coff) \times 0.0273 \end{aligned}$$

Thus, the cushioning material having the volume corresponding to 2.73% of the vacant space (i.e., inner volume) within the coffin box should be used.

Strictly, since the volume of the cushioning material cannot be zero, the increased volume of the water-proof mixture at the temperature of 90° C. when the cable is used is not completely absorbed. However, practically, since the temperature of the water-proof mixture does not reach the temperature when the cable is used, and the actually increased volume of the water-proof mixture is smaller than that of the above-mentioned case, it may be appropriate that the expanded volume can be sufficiently absorbed by the cushioning material.

When the cable connecting structure is manufactured, as shown in FIG. 8, the cushioning materials 4A, 4B with the through hole formed are engaged to the respective flange portions 20A, 20B, into which the cable or the grounding cable is inserted, before being assembled. The flange portions 20A, 20B include the cable port 3A, 3B and the tube portion 5 for retrieving a grounding cable. Except the above, the cable connecting structure can be manufactured according to the same manner as the conventional cable connecting structure.

Although the case in which the cushioning material is arranged to both ends of the coffin box is described, however, the cushioning material may be arranged to one end of the coffin box.

The coffin box comprising the cylindrical main body and the flange portions fixed to the respective ends of the main body is shown in FIG. 8, however, the above-mentioned features of the present invention can be applied to the coffin box comprising two boat form shaped coffin box pieces. In this case, the sheet type cushioning material may be arranged to the end portion(s) of the coffin box in which the cable port is installed.

As described above, even though embodiments of the cable connecting structure are described separately, which can prevent the tube portion for retrieving a grounding cable from breaking, and satisfactorily be sealed one hand, and can prevent the inner pressure of the coffin box from rising on the other hand, the cable connecting structure which has both of the above-mentioned features is within the scope of the present invention. For example, the cable connecting structure described with reference to FIG. 1 may includes the cushioning material described with reference to FIGS. 7 and 8.

What is claimed is:

1. A cable connecting structure, which includes:

a cable accommodating box comprising a box main body configured to accommodate a connected portion of two cables therein, a first flange portion which is attached to one end of said box main body, and includes a first cable port configured to receive a first cable of said two cables, and a second flange portion which is attached to other end of said box main body, and includes a second cable port configured to receive a second cable of said two cables; and a sheet of cushioning material installed within said cable accommodating box for absorbing a thermal expansion of a water proof mixture filled in said cable accommodating box, wherein said sheet of cushioning material is installed in a vicinity of at least one flange portion in such a manner that a surface of said sheet type cushioning material is perpendicular to an axis of at least one of the two cables.

2. The cable connecting structure as claimed in claim 1, wherein at least one of said first flange portion and said second flange portion are integrally formed with said box main body.

3. The cable connecting structure as claimed in claim 1, wherein said box main body and the first flange portion and the second flange portion are integrally formed and said cable accommodating box which is cut along a longitudinal axis thereof in to two facing corresponding parts is used.

4. The cable connecting structure as claimed in claim 1, wherein a volume of said cushioning material corresponds to a difference between a volume of said water proof mixture at a temperature when the cable is used and a volume of said water proof mixture at a temperature when filled in the cable accommodating box.

5. The cable connecting structure as claimed in claim 1, wherein said cushioning material comprises a polymeric foam.

6. The cable connecting structure as claimed in claim 1, further comprising a tube portion for retrieving a grounding cable, a main portion of which protrudes inward said box main body.

7. The cable connecting structure as claimed in claim 1, wherein the sheet of cushioning material is a planar sheet.

8. The cable connecting structure as claimed in claim 7, wherein said planar sheet of cushioning material is provided within said box main body such that the plane of said planar sheet type cushioning material is configured to be perpendicular to an axis of the connected portion of the two cables when the two cables are accommodated within said box main body.

9. The cable connecting structure as claimed in claim 8, wherein said planar sheet of cushioning material is installed in a vicinity of said first flange portion.

10. The cable connecting structure as claimed in claim 9, further comprising an additional planar sheet of cushioning material installed within said cable accommodating box for absorbing a thermal expansion of a water proof mixture filled in said cable accommodating box, wherein said additional planar sheet of cushioning material is provided within said box main body such that the plane of said additional planar sheet type cushioning material is configured to be perpendicular to an axis of the connected portion of the two cables when the two cables are accommodated within said box main body, and wherein said additional planar sheet of cushioning material is installed in a vicinity of said second flange portion.

11. The cable connecting structure as claimed in claim 8, wherein said planar sheet of cushioning material has a through hole extending therethrough in a direction perpendicular to the plane of said planar sheet type cushioning material, and wherein said through hole is configured to receive one of the two cables.

12. The cable connecting structure as claimed in claim 8, further comprising an additional planar sheet of cushioning material installed within said cable accommodating box for absorbing a thermal expansion of a water proof mixture filled in said cable accommodating box.

13. The cable connecting structure as claimed in claim 12, wherein said additional planar sheet of cushioning material is provided within said box main body such that the plane of said additional planar sheet type cushioning material is configured to be perpendicular to an axis of the connected portion of the two cables when the two cables are accommodated within said box main body.

14. The cable connecting structure as claimed in claim 13, wherein said additional planar sheet of cushioning material is installed in a vicinity of said second flange portion.

15. The cable connecting structure as claimed in claim 13, wherein said additional planar sheet of cushioning material has a through hole extending therethrough in a direction perpendicular to the plane of said additional planar sheet type cushioning material, and wherein said through hole is configured to receive one of the two cables.

16. A cable connecting structure comprising:

a cable accommodating box including:

a box main body configured to accommodate a connected portion of two cables therein;

a first flange portion attached to one end of said box main body, said first flange portion includes a first cable port configured to receive a first cable of the two cables; and a second flange portion attached to another end of said box main body, said second flange portion includes a second cable port configured to receive a second cable of the two cables; and a planar sheet of cushioning material provided within said cable accommodating box, wherein said planar sheet of cushioning material is provided within said box main body such that the plane of said planar sheet type cushioning material is configured to be perpendicular to an axis of the connected portion of the two cables when the two cables are accommodated within said box main body.

17. The cable connecting structure as claimed in claim 16, wherein said planar sheet of cushioning material is installed in a vicinity of said first flange portion.

18. The cable connecting structure as claimed in claim 16, wherein said planar sheet of cushioning material has a through hole extending therethrough in a direction perpendicular to the plane of said planar sheet type cushioning material, and wherein said through hole is configured to receive one of the two cables.

19. The cable connecting structure as claimed in claim 16, further comprising an additional planar sheet of cushioning material provided within said cable accommodating box.

20. The cable connecting structure as claimed in claim 19, wherein said additional planar sheet of cushioning material is provided within said box main body such that the plane of said additional planar sheet type cushioning material is configured to be perpendicular to an axis of the connected portion of the two cables when the two cables are accommodated within said box main body.

* * * * *